United States Patent [19]

Hyink

[11] 4,332,568

[45] Jun. 1, 1982

[54] CABINET WITH ELECTRICAL APPARATUS FOR USE IN TEACHING

[76] Inventor: Darryl E. Hyink, 10256 W. 151st St., Orland Park, Ill. 60462

[21] Appl. No.: 843,549

[22] Filed: Oct. 19, 1977

[51] Int. Cl.³ .......................................... G09B 23/18
[52] U.S. Cl. ................................................ 434/224
[58] Field of Search ....................... 35/19 A; 206/372

[56] References Cited

U.S. PATENT DOCUMENTS

| | | | |
|---|---|---|---|
| 1,271,641 | 7/1918 | Werwath | 35/19 A |
| 1,417,814 | 5/1922 | Fairweather | 206/372 X |
| 3,077,696 | 2/1963 | Barnett | 35/19 A X |
| 3,080,664 | 3/1963 | Bland | 35/7 A X |

OTHER PUBLICATIONS

Edward Student Wiring Stand No. 05-025-04, p. 7 of "Edwards Technological Teaching Equipment" of Canada Catalog, Oct. 1965.
Office of Education, HEW OE-84024, "3-D Teaching Aids for Trade", Copyright 1961, p. 21, Electric Wiring Board.
Marie Antoinette Jewel Cabinet, p. 195, 1974 Best Products Buyers Book.
Electronic Trainer Kit, p. 125, 1969 Cenco Educational Catalog.

Primary Examiner—Harland S. Skogquist
Attorney, Agent, or Firm—James J. Conlon

[57] ABSTRACT

A modular teaching and demonstrating laboratory having a cabinet with electrical apparatus mounted on a hinged outside cover and has a number of compartments contained therein for the transport of electrical fixtures that are used in conjunction with the externally attached electrical apparatus. The external electrical apparatus provides a pre-assembled electrical circuit of boxes and connecting conduit that are used to teach and demonstrate electrical principles and operation.

2 Claims, 8 Drawing Figures

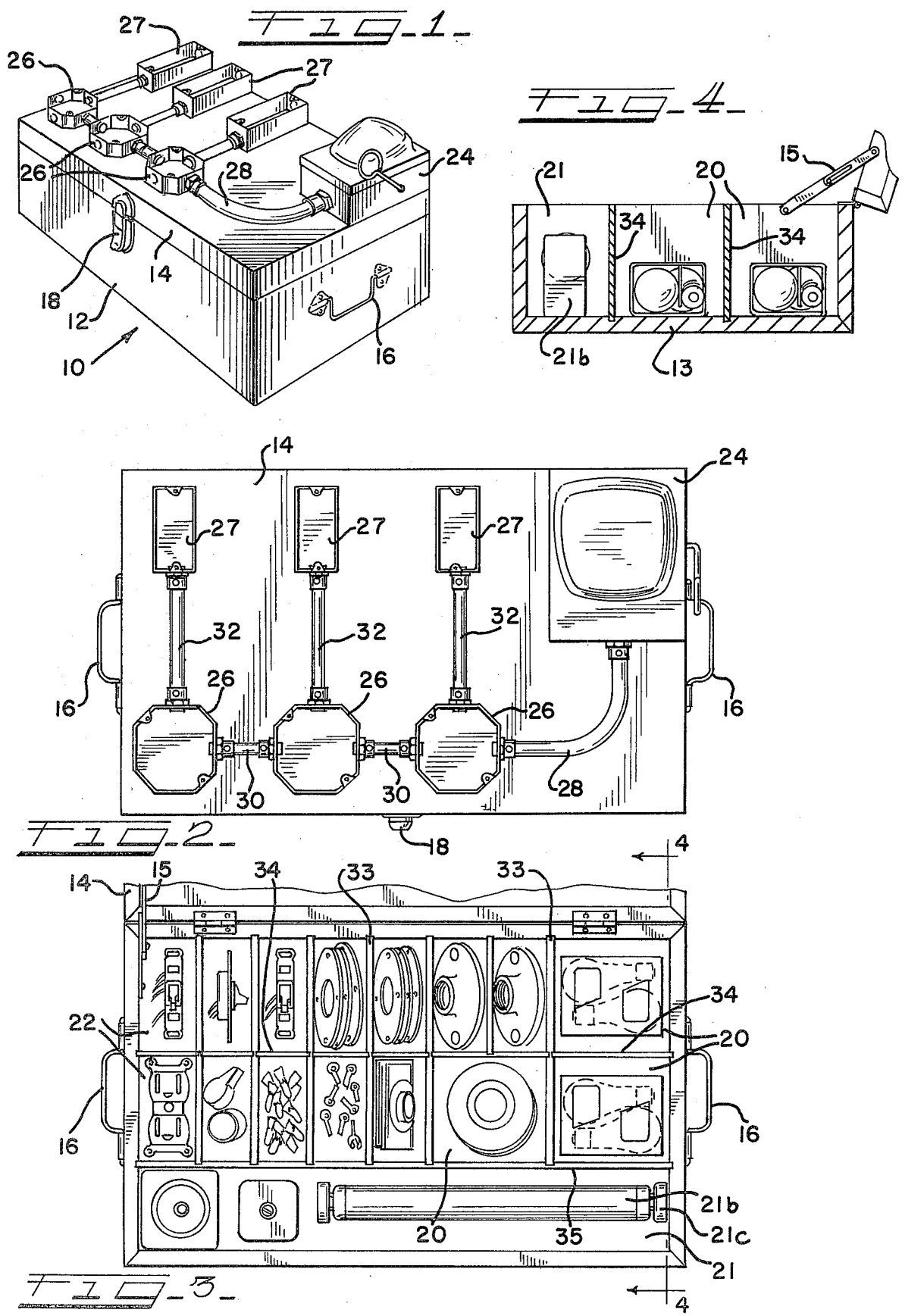

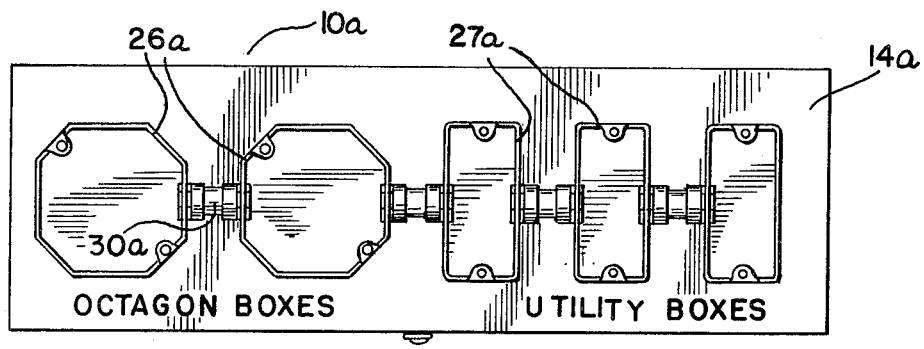
FIG-5-
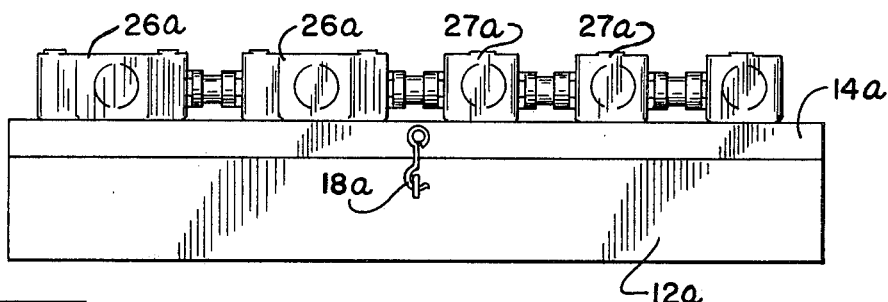
FIG-6-
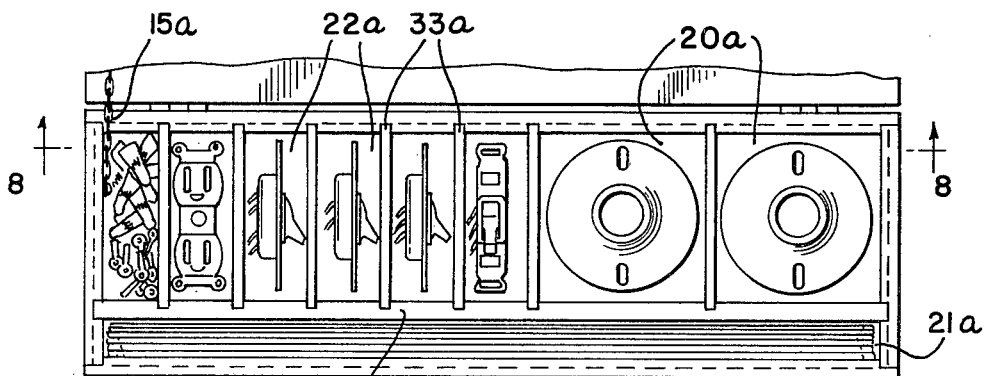
FIG-7-
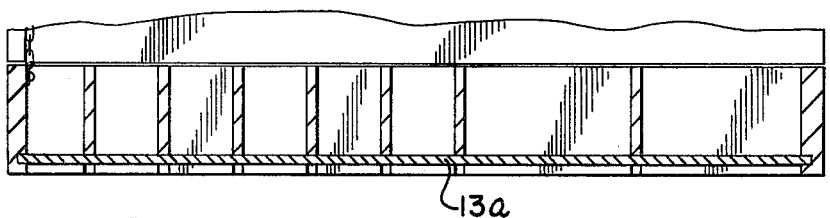
FIG-8-

4,332,568

CABINET WITH ELECTRICAL APPARATUS FOR USE IN TEACHING

BACKGROUND OF THE INVENTION (1) Field of the Invention

This invention pertains to educational devices used to illustrate a number of different basic wiring configurations and electrical principles pertaining to house wiring. The unit is self-contained and may be easily stored and transported between locations such as classrooms.

(2) Description of the Prior Art

In the past, teaching of fundamental electrical wiring practices to high school and trade school students involved one or both of the following procedures. Namely, a display panel having electric connectors with associated boxes and connecting conduit could be hooked up on a permanent basis to display boards or to a framed wall thus requiring excessive space, while the electrical outlets, wires, sockets, switches and the like were stored at another location. The inconvenience of repeated apparatus set-up during a school day and the difficulties inherent in teaching methods using only a single display panel or demonstrating unit have resulted in inconvenience to both the student and the teacher because of excessive amounts of time necessary to construct a display panel each time a particular circuit is to be wired. In utilizing pre-assembled display panels, it has been inconvenient to obtain display devices such as receptacles, switches and the like from storage locations away from the display panel. Thus, time consumed in obtaining various teaching components and constructing the circuits, combined with the large space occupied by large display panels have required teachers to lecture to classes and has prevented students from obtaining "hands on" experience, and prevented students from receiving complete and meaningful instruction.

Further, most contemporary facilities are organized for teaching theoretical aspects of electricity and many facilities are directed to teaching electronics. Facilities for teaching electronics and theory leave little or sometimes no facilities for teaching and demonstrating basic house wiring principles which are necessary to develop electrical skills needed by great numbers of students. Consequently, existing facilities and emphases are incompatible with requirements for teaching basic electrical wiring.

SUMMARY OF THE INVENTION

This invention pertains to a modular, portable teaching and demonstrating laboratory used to demonstrate both basic electrical circuits and the use of different circuit components such as plug-in receptacles, light switches and the like.

A cabinet with a number of internal compartments filled with electrical devices is enclosed with a hinged cover having specially arranged house wiring components such as connector boxes and outlet receptacle boxes interconnected with conduit and securely mounted to the external side of the hinged cover which forms the cabinet top. In use, the cabinet may be easily transported within or between classrooms. Students can wire basic circuits, carry the unit to a teacher for inspection and plug in the circuit to determine if the wiring has been performed properly. Because all the components used in a lesson or demonstration are contained in and on the cabinet, there is a reduced set-up time needed, thus allowing more student time available to wiring circuits and more teacher time available to teach, demonstrate and evaluate each student.

These and other objects and advantages of the invention will become apparent to those having ordinary skill in the art with reference to the drawings, description and claims.

BRIEF DESCRIPTION OF THE DRAWINGS

FIG. 1 is a perspective of one version of the electrical apparatus disclosed herein;

FIG. 2 is a top plan view of the apparatus illustrated in FIG. 1;

FIG. 3 is a top plan view of the internal compartments of the apparatus illustrated in FIG. 1;

FIG. 4 is a sectional view taken generally along lines 4—4 of FIG. 3;

FIG. 5 is a top view of another embodiment as disclosed herein;

FIG. 6 is a front view of the embodiment shown in FIG. 5;

FIG. 7 is a top view of the embodiment shown in FIG. 5 with the top in an open position, showing the internal compartments and items contained therein; and, FIG. 8 is a cross section view of the compartments taken generally along lines 8—8 of FIG. 7.

DETAILED DESCRIPTION

Referring to the drawings and in particular to FIG. 1 there is shown a portable cabinet 10 having a lower section 12 and a cover 14. Latch 15 may be used to connect the lower section 12 and cover 14 for holding these members open and positioning cover 14 above a work surface when the cabinet is open. Handles 16 are attached at each end to allow the unit to be easily grasped for transport. A conventional lock 18 may be used to secure the lower section 12 and the cover 14.

The lower section 12 includes a bottom 13 and a number of compartments and can have a depth in the range of three inches. Three larger rectangular compartments 20 may be used to transport and display large electrical components such as packages of light bulbs (FIG. 2), light bulb receptacles, cover plates and the like. An elongated rectangular compartment 21 is located adjacent to larger compartments 20 and may be used to transport and receive a fluorescent tube 21b and its mounting fixture 21c. Other elongated rectangular compartments 22 are approximately 2"×4" and extend in a direction at right angles to the elongated rectangular compartment 21. Compartments 22 may be used for storage and display of smaller electrical components such as outlets, smaller cover plates, knobs, connectors, switches and the like (FIG. 2).

As shown in FIGS. 1 and 2, the cover 14 has an electrical hook-up secured thereto. This electrical hook-up is self-contained insofar as it contains a fuse box 24 for the initial entrance and distribution of electrical current as would occur in any conventional house wiring system. Associated with fuse box 24 are octagon or connector boxes 26 in which wiring is joined and distributed to branch lines and ultimately to utility boxes 27. A curved conduit pipe 28 extends from fuse box 24 and combines with shorter conduit sections 30 and longer conduit sections 32 to interconnect the electrical system components.

As shown in FIG. 2, internal compartments 20, 21, 22 are formed by transverse dividers 33 which cooperate with longitudinally arranged dividers 34, 35. The dividers may be recessed at each end into a cutout portion of the lower section 12. Similarly, dividers 34 are recessed into cutouts in associated transverse dividers 33. As shown in FIG. 4, dividers 34 may have a bottom portion recessed into cutouts in the bottom 13 of the lower section 12. With this construction it is possible to provide a variety of receptacle configurations to accommodate a variety of electrical components. This construction, while versatile, is extremely rugged and able to withstand the use of students over a long period of time. Wood is suggested for use as a material because of its good electrical insulation properties, its ability to absorb physical shock, and easy to repair should any damage occur.

A modified version of the wiring laboratory is disclosed in FIGS. 5–8. Because of similarities between the modified version and the version illustrated in FIGS. 1–4, similar parts will be identified by the same numerical designation with the addition of a suffix "a". Thus the modified version also provides a cabinet 10a with a lower section 12a that may be closed off by a one-piece cover 14a. A chain 15a interconnects lower section 12a with cover 14a. A hook-type lock 18a may be used to secure the lower section 12a and cover 14a.

Like the larger more expensive version shown previously, this modified version has a number of internal compartments 20a, 21a, 22a that are used for storage. It is recommended that two larger compartments 20a be provided for larger electrical devices associated with house wiring. An elongated compartment 21a is provided to store wire, pieces of conduit, and the like. Other compartments 22a can be used for the storage of other smaller devices associated with house wiring.

Like the larger version discussed earlier, this version has a number of transverse dividers 33a which are fitted at one end into the lower portion 12a and at the other end into longitudinal divider 35a. Divider 35a is attached at each end into recesses of the lower section 12a. Dividers 33a can be arranged in any convenient fashion to facilitate storage of any desired equipment.

On the outside of the modified version of the teaching laboratory, the cover 14a may have a number of electrical boxes such as octagon connector boxes 26a and connector or utility boxes 27a. Boxes 26a, 27a are interconnected by short pieces of conduit 30a and appropriate connectors for secure attachment to the associated boxes.

In use, either portable cabinet 10, 10a may be easily stored and later transported between locations as needed. These portable laboratories, as they are called, are self-contained. That is, each contains equipment such as wires, terminals, switches, and the like to enable students to perform complete wiring lessons. Because each portable lab is self-contained there is little or no need for a central supply station for students to constantly visit to obtain equipment. Because only the rugged metal components are attached on the outside of the cabinets 10, 10a there is little or no danger that damage could be inflicted on the more fragile system components that are stored within the cabinets. When various electrical devices contained within the lower sections 12, 12a are selected for attachment to the conduit and box arrangement, they may simply be removed from the lower section and installed as required. Wire and tools needed for stripping the wire are also contained within the cabinet 10, and are used as required to show how the wire is fitted through conduits and connected to various connector boxes 26a and circuits.

The foregoing description and drawings merely explain and illustrate the invention and the invention is not limited thereto, except insofar as the appended claims are so limited, as those who are skilled in the art who have the disclosure before them will be able to make modifications and variations therein without departing from the scope of the invention.

What is claimed is:

1. A portable, hand held teaching laboratory comprising:
   a self-contained teaching and demonstrating device for use in schools with house wiring apparatus permanently affixed to a cabinet and having wiring devices in compartments;
   said cabinet having a top cover and a lower unit;
   said lower unit providing a receptacle with a plurality of various size compartments for carrying electrical items;
   electrical apparatus comprising a plurality of electrical connector box means and a plurality of receptacle box means associated with each connector box means;
   electrical conduit interconnecting the connector box means and the receptacle box means;
   means permanently mounting the electrical apparatus to the outside of said top cover;
   said compartments comprising a first elongated rectangular compartment extending the length of said lower unit for carrying and displaying electrical apparatus;
   said compartments also including a plurality of second rectangular compartments positioned at right angles to the first rectangular compartment;
   said cabinet having handle means for grasping and carrying the cabinet between locations;
   hinge means interconnecting the top cover and the lower unit and including latch means for positioning the top cover and the attached electrical apparatus at an angle above a supporting surface;
   said cabinet comprising wood means;
   electrical items carried with said compartments; and
   said electrical items including switch means and electrical outlet means.

2. The portable teaching laboratory of claim 1 wherein the lower unit includes:
   a pair of spaced sides and a pair of spaced ends;
   means connecting said ends and sides to form a four-sided compartment;
   said four-sided compartment being a non-conducting material;
   said ends and sides having a horizontally extending groove;
   a bottom with means positioned in said horizontally extending groove;
   said sides and ends of the lower unit also having vertically arranged groove means;
   divider means with means insertable into the vertically arranged groove means to provide said plurality of compartments.

* * * * *